United States Patent [19]
Throckmorton et al.

[11] Patent Number: 5,818,441
[45] Date of Patent: Oct. 6, 1998

[54] SYSTEM AND METHOD FOR SIMULATING TWO-WAY CONNECTIVITY FOR ONE WAY DATA STREAMS

[75] Inventors: John A. Throckmorton, Lake Oswego; Edward R. Harrison; Burt Perry, both of Beaverton, all of Oreg.

[73] Assignee: Intel Corporation, Santa Clara, Calif.

[21] Appl. No.: 490,822

[22] Filed: Jun. 15, 1995

[51] Int. Cl.[6] .................................................. H04N 7/10
[52] U.S. Cl. ................................ 345/328; 348/13; 348/7; 348/12
[58] Field of Search .................................... 345/327, 328; 348/7, 12, 13, 473, 714

[56] References Cited

U.S. PATENT DOCUMENTS

| | | | |
|---|---|---|---|
| 5,347,304 | 9/1994 | Moura et al. | 348/12 |
| 5,499,046 | 3/1996 | Schiller et al. | 348/12 |
| 5,513,180 | 4/1996 | Miyake et al. | 348/7 |
| 5,583,864 | 12/1996 | Lightfoot et al. | 348/7 |
| 5,594,491 | 1/1997 | Hodge | 348/7 |
| 5,613,192 | 3/1997 | Ikami et al. | 348/9 |

*Primary Examiner*—Victor R. Kostak
*Attorney, Agent, or Firm*—Blakely, Sokoloff, Taylor & Zafman

[57] ABSTRACT

A system supplying information associated with a broadcast television program to a consumer such that said consumer perceives the associated data as the result of two way interactivity with external sources of data such as online services or the Internet. The system includes equipment for inserting the associated data into the vertical blanking interval of the television signal on the supplier side of the system. On the receiving side, the system includes a personal computer capable of receiving the television program and storing the associated data locally. The consumer may then interact with the stored associated data in an apparently two way interactive manner. Additional interactivity may be achieved by adding an actual two way communication channel to the personal computer so that online services or the Internet may be accessed. This two way communication channel is made particularly effective if the associated data contains pointers to locations in the online services or the Internet which are particularly relevant to the television program.

42 Claims, 5 Drawing Sheets

SYSTEM AND METHOD FOR SIMULATING TWO-WAY CONNECTIVITY FOR ONE WAY DATA STREAMS

BACKGROUND OF THE INVENTION

1. Field of the Invention

This invention relates to enhancing one-way broadcast data transmissions. More particularly, it relates to enhancing the quality and content of a primary information stream by creating and transmitting associated data which provides the appearance of an interactive connection to secondary sources of information.

2. Background

One of the limitations of nearly all forms of electronic mass media such as radio, television, audio CD's and video cassettes is that the communication of information or data is one way from the provider to the consumer. The characteristics of one way sources of data are that the data is sent sequentially and is fleeting or at best can be recorded for later playback. And a consumer cannot interact with the data provided to seek additional information or services.

There is a desire by electronic mass media consumers for additional services, and providers of television and radio broadcast services are looking for new sources of revenue. In particular, consumers are looking for information or data that is related to what they are viewing in the media. The additional information may be in the form of details on the content of the current program such as the recipe of a meal being demonstrated on a cooking show or biographies of actors in a drama or historical background information on events depicted in a program. Or, it could be program highlights such as key plays from the baseball game. In addition, consumers would like access to real time data such as stock price, updated baseball scores as they occur, traffic and weather conditions. Also, consumers would like to have access to special services associated with product advertising such as information on where to buy nationally advertised products—possibly with a map to the nearest location, or the ability to instantly receive coupons.

Recently, online services such as provided by the World Wide Web of the Internet have become available. Such services provide access to immense amounts of data on an interactive basis by linking digital computers together over sophisticated communications networks. At the same time, the cost of digital computing power is falling rapidly. For example, many homes now have one or more computers. And home computers have displays capable of showing television as well as audio capability. They also have memory and computing power.

But while such services are generally available and computers are becoming more widespread, finding relevant information is an arduous task that may take hours of searching even for an experienced user.

In addition, these services require a 2-way connection from a consumer's location to the online network. In the consumer market, prolonged utilization of a single phone line for 2-way digital communications is expensive.

Up until now, there has been no way for producers of mass market broadcast programming to deliver data associated by its relevancy to its subject matter that could be interactively displayed and manipulated by consumers on a real time basis. What is meant by real time is that the consumer receives and has access to the relevant data during the process of program reception. Therefore the data becomes an integral part of the experience desired by the program producers.

Although received during a program, the information is retained and may be traversed by the consumer at a later time, as if they were connected in a 2-way fashion to an online service.

3. Prior Art

Perhaps the earliest effort to address the foregoing needs is for program content providers to include a telephone number in either the radio or television broadcast. The consumer is invited to dial a number for additional information. However, this telephone number is part of the primary data stream which is transitory.

A second attempt is the provision of closed caption programming for the hearing impaired on television. This takes the form of written text appearing somewhere on the television screen typically at the bottom and requires a special decoder or mode set on the television. The text is a written rendition of the audio portion of the television program. That is, it is a recapitulation of the information supplied by the primary data provider and is not stored or saved for later access by the consumer.

Television networks also use a part of the unused bandwidth in the video signal to send the schedule of programs coming up on that network. One network is sending a comprehensive program listing in digital format over an unused section of the NTSC bandwidth. This is called an electronic program guide ("EPG"). A second network uses a portion of the unused NTSC bandwidth to send digitally encoded stock quotes and the subject matter of the topics covered in the news broadcast, and extended data services ("XDS") sends the date, time, name of a scheduled program, type of program and how much of the program remains. Cable services provide additional detail about songs being played on subscriber digital audio services such as digital music express ("DMX(tm)"); The detail typically consists of the name of the artist, the name of the song and the album. A system called Gemstar(tm), provides information in digital format that enables consumers to record programs by referencing a number in a program guide.

Many of the foregoing services are provided on broadcast television only over what is called the vertical blanking interval (the "VBI"). The VBI is a portion of the bandwidth defined for broadcast television and in the case of NTSC, for example, consists of the first 21 of the 525 raster lines that define a video frame. SECAM and PAL have a similar arrangement. Of the 21 lines, line 21 is divided into two frames of 60 hz bandwidth each. The closed caption is provided in the first frame of line 21.

None of the foregoing allow a consumer to experience apparent interactivity with external data sources. That is, none provides data that persists for more than a few seconds and none allows the consumer to manipulate directly that data.

SUMMARY OF THE INVENTION

The foregoing problems may be resolved by a system for supplying a primary data stream and associated data to a consumer such that the consumer perceives the associated data as the result of interactivity with external sources of information. This system includes a creation unit for creating the primary data stream and the associated data. The primary data stream and associated data are supplied to a one way delivery unit for delivering the primary data stream and the associated data to the consumer. At the consumer location, the system includes a receiver for receiving the primary data stream and a receiver for receiving the associated data. These may be the same unit. The system further includes computer memory storing the received associated data. A processor communicates with the memory for accessing the associated data. Finally, the system includes a user interface connected to the processor through which the consumer may interact with the system.

The method of the present invention includes the steps of first generating a stream of primary data and of associated data. Next, both the primary data stream and associated data are delivered to the consumer. Next, both the primary data stream and the associated data are received at the location of the consumer. The primary data stream is rendered to the consumer as it arrives. The associated data is stored in local storage. Next the associated data is accessed by retrieving it from local memory.

BRIEF DESCRIPTION OF THE DRAWING

The preferred embodiments of the invention will now be described in connection with the drawing wherein.

DESCRIPTION OF THE PREFERRED EMBODIMENT

An electronic mass media provider may be said to deliver a one-way stream of electronic data. This stream of data is herein referred to as a primary stream of data and includes live or pre-recorded information that is created by the broadcasting and entertainment industries for the purpose of delivery to consumers over delivery mediums such as broadcast television, video cassettes, radio and audio CD's. The content of the primary data stream is typically created by production studios for mass distribution to the consumer market. Often a distributor produces all or part of the programming content. For example, a local television news station obtains pre-produced video news and advertising content from national providers and inserts locally produced content and advertising for broadcast. Equipment used in the television industry are video cameras and video recorders. In radio, it is microphones and audio recorders. Typically, the primary data is organized into programs. A primary stream of data can be rendered intelligent to a consumer as either audio or video or a combination of the two.

The term associated data as used herein refers to a stream of data generated separately from the primary data but having content that is relevant to the primary data in general and usually relevant to a particular program of primary data and is in this sense associated. Associated data is intended to enhance the utility of the primary data stream, but if it is not available, the primary data stream can stand on its own merits. The creation process typically uses commercially available software and hardware that output industry standard file formats such as Hypertext Markup Language (HTML) for text and graphic layout, Graphics Interchange Format (GIF) Joint Photographic Experts Group (JPEG) formats for still images, and so forth.

Figure 1:
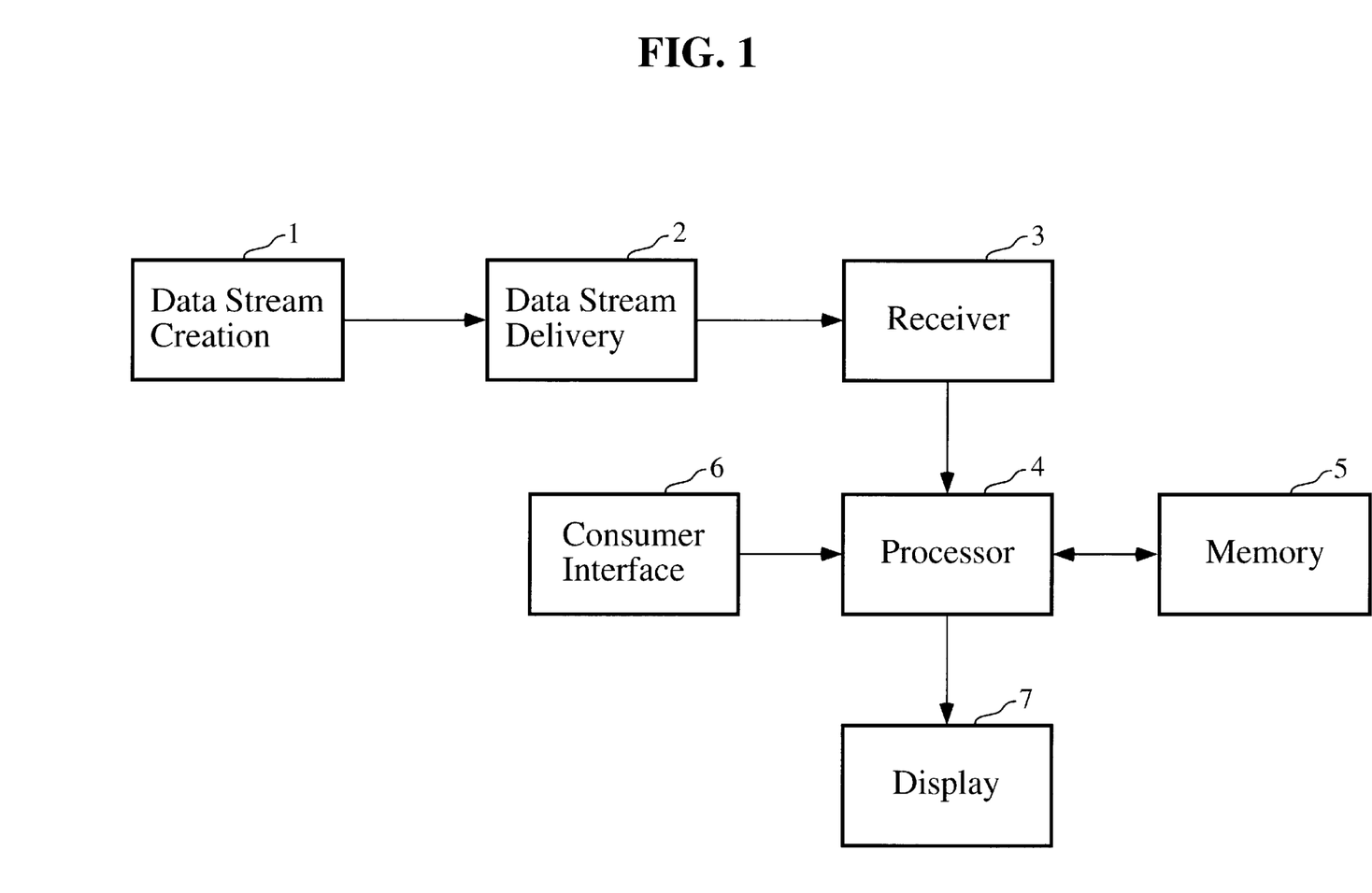
FIG. 1 is a block diagram of the invention at the highest level of abstraction.

FIG. 1 is a block diagram of the invention at the highest level of abstraction. Referring now to FIG. 1, data stream creation unit 1 performs the function of generating both the primary data stream and the associated data stream. The two data streams may or may not be merged to create a combined stream of primary and associated data. The two data streams are supplied to non-interactive delivery unit 2 which performs the function of delivering the two data streams to the consumer. The non-interactive delivery unit includes delivery by broadcast, cable or a packaged media such as cassettes and audio CD's. Indeed, non-interactive delivery is intended to include all one-way electronic data delivery systems. The primary data stream and secondary data stream are typically transmitted to a consumer over the same delivery medium; however, the invention contemplates situations where this is not the case. For example, the primary data stream could be delivered by broadcast television and the associated data could be delivered over a high speed digital network, a FM sideband, a direct satellite broadcast, a cable network, a telephone, etc.

When the delivered data reaches receiver 3, it is decoded from its delivery medium. That is, if it is sent by broadcast television, the receiver decodes the signal, separates the primary data from the associated data and passes the associated data on to processor 4. Processor 4 may further decode the associated data and in any event supplies the associated data to memory 5 where it is stored for future use. The consumer of the primary data stream may interact with the associated data via user interface 6 such as a keyboard, mouse or voice activation electronics through which the consumer gives commands to processor 4 and which in turn causes the associated data to be accessed and processed. The resulting data is then supplied to display 7.

Figure 2:
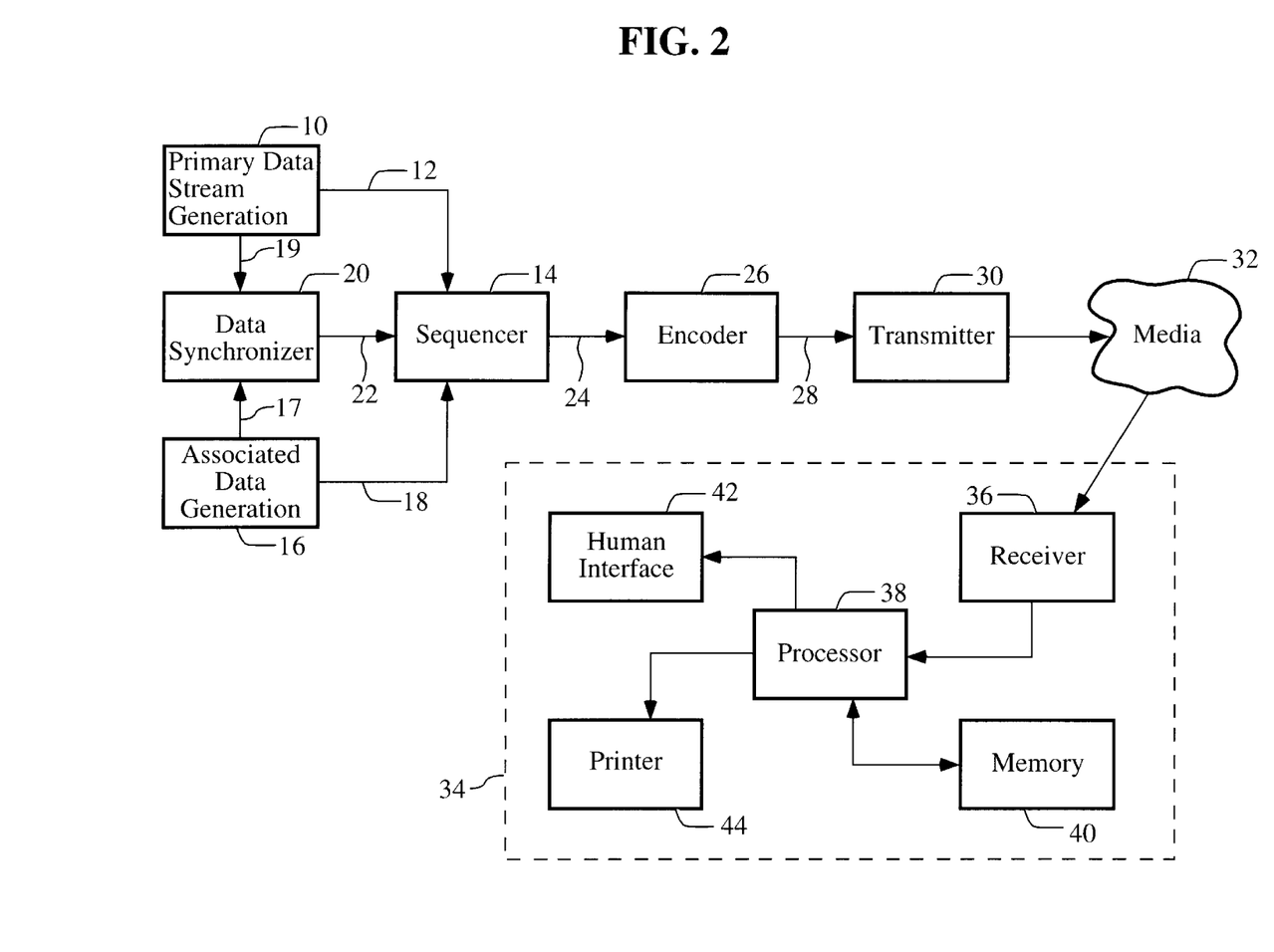
FIG. 2 is a block diagram showing further detail of the entire system according to the present invention.

FIG. 2 provides additional system detail. Referring now to FIG. 2, reference numeral 10 refers to the primary data stream generating sub-system. The output of primary data stream generation sub-system 10 is typically an analog signal. However, it may be a digital signal as in the case of digital broadcast television. Data channel 12 connects primary data stream generation sub-system 10 and sequencer 14 and data channel 19 connects it to data synchronizer 20. Data channels 12 and 19 may be initiated by a live video feed, or analog or digital tape. Reference numeral 16 refers to an associated data generation sub-system. The output of associated data generation sub-module 16 is a digital signal that is supplied over digital data link 18 to sequencer 14 and over digital data link 17 to synchronizer 20. The digital data links of the system may be a conventional digital connection such as a serial or parallel or it may be a network link. Typical connecting media would be twisted pair, co-axial cable, fiber optic cable or a wireless media.

Reference numeral 20 refers to a data synchronizing sub-system whose function is to synchronize the primary data stream generated by sub-system 10 with specific associated data. The input to data synchronizing sub-system 20 is scene information from the primary data stream in the form of timecodes and time durations, and data from associated data generator sub-system 16. It creates a so called script for the delivery and display of associated data at specific points in time. For example, data synchronizer 20 creates a script that specifies that a detailed data sheet will be delivered to the consumer prior to a specific television product advertisement, and that the data sheet will be displayed on the consumer's personal computer display when a certain television advertisement starts.

Data synchronizer 20 typically includes software which is patterned after common digital video editors such as Adobe's Premiere, which places parallel video and audio tracks on a standard time line such as SMPTE (Society of Motion Picture and Television Engineers) time code. This allows segments of each track to be manipulated independently but with reference to a common time line so that segments may later be reconstituted. The software of data synchronizer 20 allows associated data to be laid out and manipulated on an additional data track. The size of particular associated data components is coordinated with the known bandwidth of the delivery medium. The user of data synchronizer 20 typically specifies that a unit of information should be displayed at a specific point in time. Data synchronizer 20 then calculates the time required to transfer the data and inserts a transfer specification into the script at the appropriate point prior to the display instruction. The output of data synchronizer sub-system 20 is a digital signal representing a script that synchronizes the output of primary data stream sub-system 10 and associated data stream generator 16.

The output of data synchronizer 20 is supplied over digital data link 22 to sequencer sub-system 14. Digital data link 22 is a conventional digital link. Sequencer 14 combines the primary data stream with the associated data as specified by the script supplied by synchronizer sub-system 20. Sequencer 14 monitors the output from primary data stream sub-system 10 to obtain the information necessary to sequence transmission of associated data. For example, during the broadcast of a television program, data sequencer 14 obtains a time code information such as SMPTE time code which is generated by the primary data stream. The information is used to coordinate mixing of associated data with primary data streams. In addition, sequencer 14 mixes other data feeds that are being transmitted over the same delivery medium. These may include external data services such as financial data, emergency broadcast information or weather information. Mixing of existing data streams is necessary only for delivery mediums that don't support separate, independent transmission of digital information. This function has the capacity to be used for the delivery of either live or pre-recorded programming, or a combination of both. For live programming, such as a local evening news program, the data stream sequencer takes input directly from the outputs of primary data stream generator 10, data synchronizer 20, associated data generator 16, and time code from the primary data stream. For pre-recorded programming, this function processes the output of the data synchronizer 20 and sequences the broadcast of associated data with the primary data.

The output of sequencer 14 is supplied over conventional digital data link 24 to encoder 26. Encoder 26 is a hardware component for insertion of digital information into the particular delivery medium that will be received by the consumer. If the delivery medium is broadcast television, encoder 26 inserts this information directly into the NTSC television signal, and thus delivers both the primary and associated data over a single delivery medium, broadcast television radio waves. Encoder 26 accepts input streams of both video and serialized digital information. It breaks the serialized digital information up into a series of packets, and modulates the packets into the ("VBI") of the video signal. Encoder 26 is commercially available hardware and software. A number of vendors market hardware for insertion and extraction of data into and from standard (NTSC/PAL) television signals. Norpak Corporation, EEG, Inc, and WavePhore, Inc. are examples.

The output of encoder 26 is supplied via digital data link 28 to transmitter sub-system 30 which performs the function of physically transmitting radio frequency waves into the atmosphere. Such transmitters may be television or radio broadcast transmitters or a satellite broadcast system. Also, the data may be stored on a tape for later transmission.

Reference numeral 34 generally indicates the equipment that must be present at the consumer's location. In general, system 34 is a computer. That is, it has digital computing capability as well as equipment to receive the primary and associated data streams. Receiver 36 could be a personal computer add-in adapter board, a television or radio broadcast receiver, a cable television converter box or it could be a satellite receiver for digital broadcast. In the preferred embodiment, it is a broadcast television receiver or tuner inside of a personal computer. Connected to receiver 36 is a microprocessor 38. Connected to microprocessor 38 is memory 40 which would typically be semiconductor RAM. Additional magnetic media such as a hard disk would be desirable. Microprocessor 38 is connected to human interface 42, which is typically a CRT monitor, and to printer 44. Human interface 42 and receiver 36 could be part of a standard television.

Reference numeral 32 refers to the delivery media which in this case are radio frequency electromagnetic waves passing through the atmosphere. If the delivery media is a video tape, laser disk or audio CD, then, transmitter 30 becomes a video tape recorder, video or audio CD recorder, and receiver 36 becomes a VCR, laser disk player or an audio CD player respectively.

Figure 3:
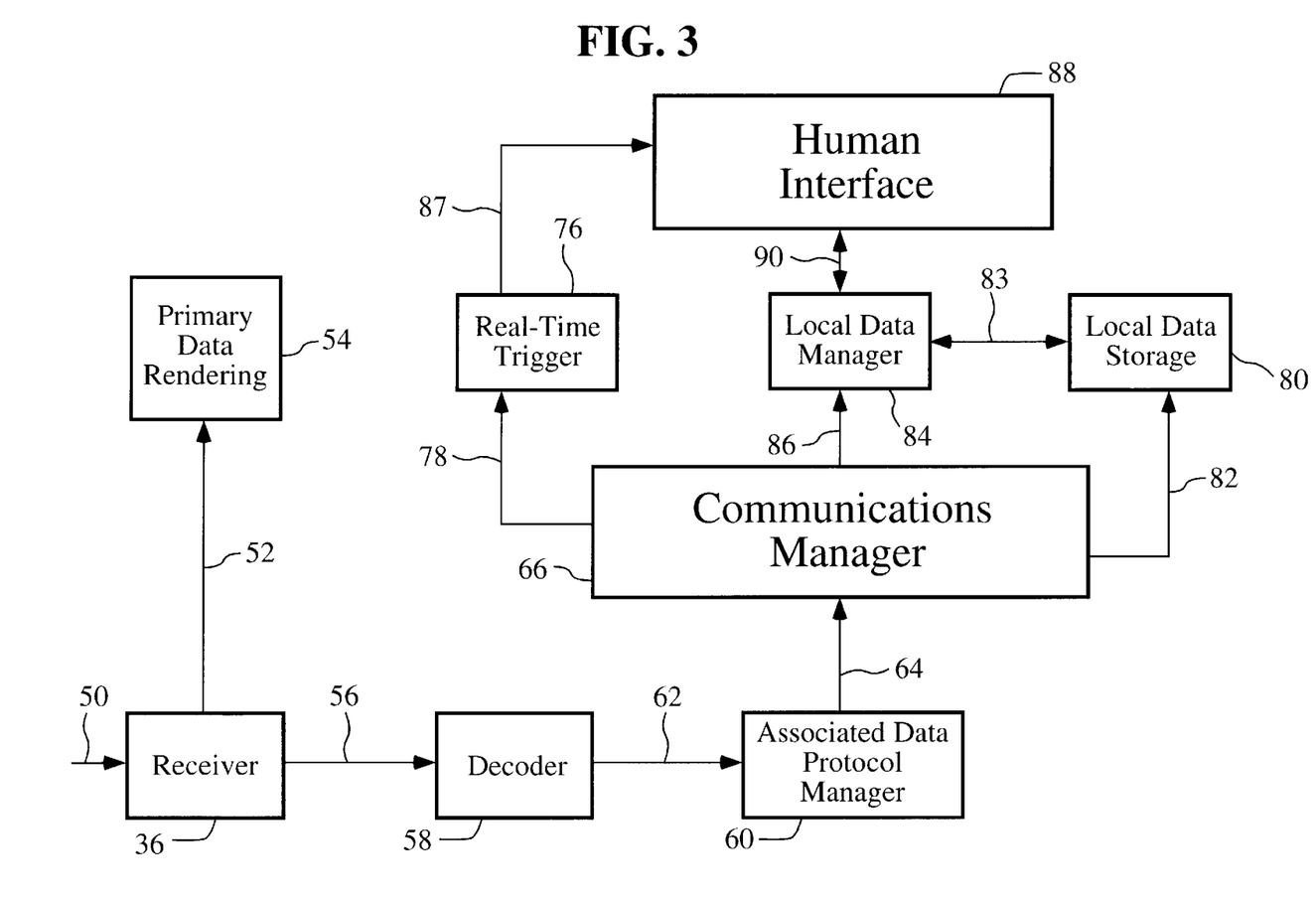
FIG. 3 is a block diagram showing additional detail of the system located with the consumer.

FIG. 3 is a high level block diagram showing further details of system 34 of FIG. 2. Referring now to FIG. 3, receiver 36 receives radio frequency waves from input 50. Receiver 36 demodulates the input signal and supplies the primary data stream signal over data path 52 to primary data rendering sub-system 54 and the associated data signal over data path 56 to associated data decoder 58.

Primary data rendering sub-system 54 performs the function of presenting the primary data stream to the consumer in the manner in which a typical consumer would expect to see the data presented. For example, in the case of television, the primary data rendering takes the form of a video image typically supplied by a cathode ray tube screen, or possibly a liquid crystal display screen and audio provided by an audio amplifier and speakers. In the preferred embodiment these components are in a personal computer. A second example is a broadcast radio demodulator, amplifier and speakers that renders radio waves received via radio broadcasting audible to a consumer. Yet a third example is a stereo system that renders data encoded on compact disk or tape audible to the consumer.

Decoder 58 performs the function of decoding the associated data from the delivery media. In this case decoder 58 consists of an analog to digital converter that converts analog encoded digital data back to digital format.

Associated data protocol manager 60 is connected by one-way data path 62 to decoder 58 and by one way data path 64 to communications manager 66. Associated data protocol manager 60 performs the function of extracting the different forms of associated data from the incoming digital data steam and converting them to a form that can be used by communications manager 66. The types of associated data protocols include World Wide Web pages, closed captioning, stock quotes, sports scores, control commands for microprocessor 38 (of FIG. 2) to execute.

Communications manager 66 performs the function of a common network interface by receiving data from several different types of communication devices using different data transmission protocols. Such devices include telephone modems, ISDN modems, cable modems, wireless modems, satellite modems, broadcast TV, radio and the like. Communication manager 66 converts all data received, regardless of the source and protocol, into a standard format that can then be utilized by the rest of the system. This function may be implemented in one of two ways. Proprietary interfaces between the communication components may be designed, or standard industry interfaces such as Microsoft Windows' (a trademark of Microsoft Corporation) sockets may be used. The preferred embodiment uses Windows sockets. A Windows socket is a standard application interface to access network data.

Real time trigger 76 is connected to communications manager 66 by one-way data path 78 and to human interface 88 by data path 87. Human interface 88 provides the consumer with input and output to the system. In the preferred embodiment, human interface 88 uses the keyboard and alternate input devices such as a mouse of a personal computer as input for requests and the display of the personal computer for displaying the data.

Real time trigger 76 accepts commands sent as part of the associated data to display a page of information without the user asking for it. The output of realtime trigger is a command sent over data path 87 to human interface 88 which causes the page of information to be displayed. For example, a broadcaster may want viewers to see a certain page of information as part of a program that is being viewed. Real time trigger allows data to be displayed using the same data protocols as consumer requested information.

Local data storage 80 is connected to communications manager 66 by one-way data path 82 and by data path 83 to local data manager 84. The hardware implementation for local data storage 80 may be one or more of the following; RAM, disk, tape, recordable CD-ROM.

Local data manager 84 is connected to communications manager 66 by data path 86 and to human interface 88 by two-way data path 90. Local data manager 84 receives commands from human interface 88 to retrieve associated data from local data storage 80 and sends that data to human interface 88 for presentation to the consumer. For example, a "Web Browser" may be used to display data pages from the World Wide Web (the "WWW"). Providers of WWW browsers include Netscape Communications Corp., America Online, Spyglass and others. Local data storage 80 will typically be of limited capacity. Thus, local data manager 84 purges older and less used information. This is accomplished by assigning an expiration date and/or a priority to associated data files. The criteria for determining which data to purge is settable by the broadcaster and/or the consumer. Criteria include total amount of storage available, size of associated data files, expiration date and priority.

The preferred embodiment illustrated in FIGS. 2 and 3 operates in the following manner. A primary data stream is generated. Associated data is separately generated. A script is generated that synchronizes how the primary and associated data are linked together. The primary data, the associated data and the script are sent to sequencer 14 where they are combined. The primary data is transmitted in the conventional fashion of its delivery medium. In the television model, this is broadcast over the air or on cable. The associated data is generally (but not always) sent by the same delivery medium as the primary data. In the case of television, the associated data is encoded in the VBI of the television signal. The signal is received by the consumer's equipment. The primary data stream is immediately rendered and the associated data is stored in local data storage 80. At any time, the consumer may browse the data stored in local data storage. This data will have been professionally selected to provide an enhanced viewing experience. For example, difficult to find data sources providing historical background to a program will have been previously researched by the associated data provider and sent as associated data. The human interface is user friendly and will allow the consumer to browse through the associated data. This might start with a menu of available information from which the consumer could select just as if the data were coming from an online service. But the data is actually stored locally. And it arrived in local storage by being transmitted with the primary data stream. The consumer may process the associated data in a variety of ways including sorting and indexing relevant information.

Figure 4:
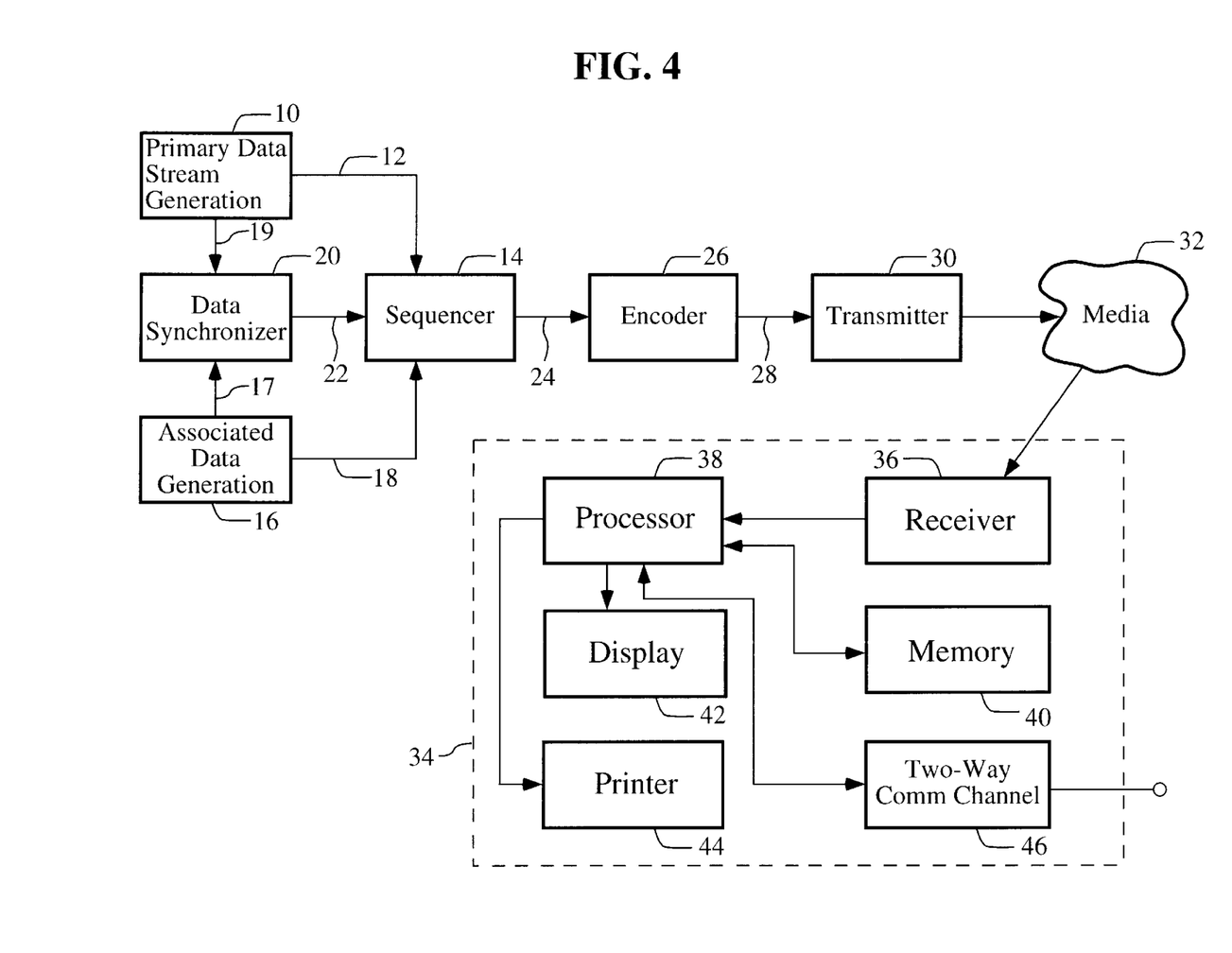
FIG. 4 is a block diagram of a second preferred embodiment of the invention that includes interactive communications.

FIG. 4 is a block diagram of a second preferred embodiment of the invention that includes interactive communications. Reference numerals common to FIGS. 2 and 4 reference the same matter. Referring now to FIG. 4, a two-way communication channel 46 is connected to microprocessor 38 and provides interactive access to remote computers over such media as the analog telephone network, the ISDN digital network, a wide area packet switched network such as X25, frame relay or asynchronous transfer mode.

Figure 5:
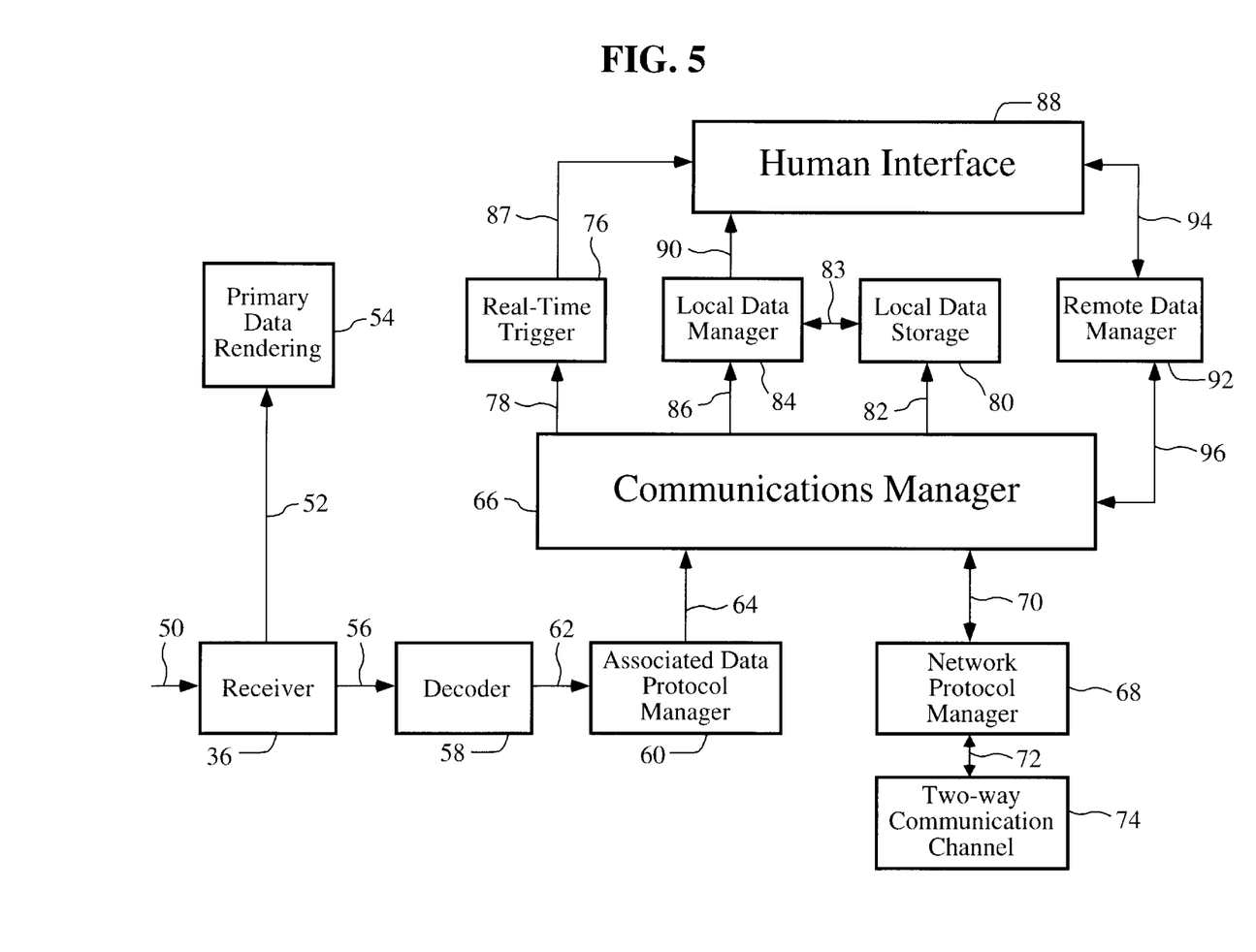
FIG. 5 is a diagram showing additional detail of the system located with the consumer when interactive communications are included.

FIG. 5 is a high level block diagram showing further details of the system of FIG. 4. Reference numerals common to FIGS. 2 and 4 reference the same matter. Referring now to FIG. 5, remote data manager 92 is connected to human interface 88 by data path 94 and to communications manager by two-way data path 96. Remote data manager 92 receives commands from human interface 88 to retrieve data from remote computers through two-way communications channel 74 and to send that data to human interface 88 for presentation to the consumer.

Network protocol manager 68 is connected by two-way data path 70 to communications manager 66 and by two-way data path 72 to two-way communication channel 74. Network protocol manager 68 performs the function of formatting data received and transmitted over two-way communication channel 74. It contains the various protocols required to communicate with remote computers. Again, operating systems such as Microsoft's Windows typically provide network protocol managers with plug in modules called drivers to support different protocols and different communication hardware. Network protocol manager 68 extracts incoming data from two-way communication channel 74 using a network protocol appropriate for the medium supported by two-way communication channel 74. Network protocol manager 68 also encodes output data using the appropriate protocol and passes the data onto two-way communication channel 74 for transmission to third party computers.

Two-way communications channel sub-system 74 provides the function of connecting the client system interactively to remote computers that may be server machines, machines at online service providers, the Internet or independent Bulletin Board Systems ("BBS"). The network to which two-way communication channel 74 is connected may be a conventional switched analog telephone system interfaced to a modem, a digital switched system such as ISDN interfaced to an appropriate adapter card, a wide area network connected through an access device, satellite technologies, and the like. A two-way communications line is used to retrieve and access information that has only thus far been received by the client system in the form of references, which are pointers to where the information actually resides.

The addition of a two-way communication channel allows a consumer to also access online services. In this case, associated data may consist of references such as uniform resource locations ("URL") which are WWW page references. Associated data may include references to Internet News Groups which are shared static messages grouped by topic which may be accessed. Associated data may also include references to Internet Relay Chat areas which are multi-person dynamic conversation streams that enable users to communicate by text messages. Or, associated data may include pointers to information on an online service such as America Online, Prodigy or Compuserve. Thus a menu may list several references. And by clicking on a reference, the system actually connects to and retrieves the referenced information from the appropriate source.

Alternatively, the associated data may itself include not only pointers to information on various online services, but the actual information which the associated data provider has acquired from an online service or source and incorporated into the associated data prior to its delivery to the consumer. For example, the associated data may contain actual Internet News Group messages related to the primary data stream. Thus, even if the consumer does not have a two-way communications channel or chooses not to use it, the invention provides the appearance and feel of an interactive connection to remote sources of relevant information.

The foregoing preferred embodiments are subject to numerous adaptations and modifications without departing from the concept of the invention. Therefore, within the scope of the appended claims, the invention may be practiced other than as specifically described herein.

What is claimed is:

1. A system comprising:
   creation means for creating a primary data stream and associated data;
   one-way delivery means for delivering said primary data stream and said associated data in a single integrated signal stream from a network to a consumer;
   consumer location equipment comprising:
   means for receiving and separating said primary data stream and associated data;
   memory means storing said associated data, said means being connected to said receiving means;
   processing means connected to said memory means for accessing said stored associated data; and
   human interface means connected to said processing means for selectively interacting with said associated data.

2. The system of claim 1 further characterized by a two-way communications channel connected to said processing means, said two-way communications channel being adapted to carry digital data in two directions.

3. The system of claim 2 wherein said means for processing said associated data includes means for consummating transactions over said two-way communications channel based at least in part upon said associated data.

4. The system of claim 2 wherein said means for processing said associated data includes means for requesting additional data over said second channel of data based at least in part on information in said associated data.

5. The system of claim 4 wherein said associated data includes data from an online service.

6. The system of claim 5 wherein said means for delivering said associated data is storage media.

7. The system of claim 1 wherein said primary data stream and said associated data are communicated by the same delivery medium.

8. The system of claim 1 wherein said primary stream of data is audio only.

9. A system comprising:
   a one-way delivery sub-system for delivering from a network to a consumer a combined data stream having a primary data stream that contains a plurality of programs and associated data that relates to one or more of said plurality of programs;
   consumer location equipment comprising:
   a receiver for receiving said combined data stream;
   a digital processor connected to said receiving means for separating said associated data from said combined data stream;
   memory storing said associated data, said memory being connected to said processor;
   a human interface connected to said memory means for accessing and selectively interacting with said stored associated data.

10. The system of claim 9 wherein said one-way delivery means for delivering said combined data stream to said consumer is television.

11. The system of claim 10 wherein said associated data is inserted into available unused bandwidth in said television signal.

12. The system of claim 10 wherein said television is broadcast television.

13. The system of claim 9 wherein said one-way delivery means for delivering said combined data stream to said consumer is radio.

14. A system comprising:
   first creation means for creating a primary data stream;
   second creation means for creating associated data,
   first one-way delivery means communicating with said first creation means for delivering said primary data stream to said consumer;
   second one-way delivery means communicating with said second creation means for delivering said associated data to said consumer;
   consumer location equipment comprising:
   first means for receiving said primary data stream;
   second means for receiving said associated data stream;
   memory means storing said associated data;
   processing means connected to said memory means for accessing said stored associated data;
   a two-way communications channel connected to said processing means, sand two-way communications channel being adapted to carry digital communications in two directions; and
   a consumer interface connected to said processing means for interacting with said associated data.

15. The system of claim 14 wherein said second one-way delivery means for communicating said associated data is a sideband carrier.

16. The system of claim 14 wherein said second one-way delivery means for communicating said associated data is a cable television communications network.

17. The system of claim 14 wherein said second one-way delivery means for communicating said associated data is a telephone line.

18. The system of claim 14 wherein said means for processing said associated data includes means for requesting additional data over said two-way communications channel and wherein said additional data is referenced by said associated data.

19. The system of claim 14 wherein said means for processing said associated data includes means for consummating transactions over said second channel of communication based at least in part upon said associated data.

20. The system of claim 19 wherein said associated data includes pointers to data in an online service.

21. The system of claim 14 wherein said associated data includes data acquired from the Internet.

22. The system of claim 14 wherein said associated data includes pointers to data on the Internet.

23. The system of claim 14, wherein said associated data includes pointers to instructions and data on another computer to be executed by said processing means.

24. The system of claim 14 wherein said primary stream of data is audio only.

25. The system of claim 14 wherein said primary stream of data is a subscription digital audio service.

26. A method comprising:

generating a stream of primary data;

generating a stream of associated data;

combining said primary and associated data into a single data stream;

delivering said combined data stream to a consumer;

separating said associated data from said combined data stream;

storing said separated associated data;

displaying said accessed associated data;

selectively interacting with said stored associated data using a computer.

27. The method of claim 26 further including processing said associated data before the displaying thereof.

28. The method of claim 27 further including storing said associated data in local non-volatile storage.

29. The method of claim 28 wherein said processing said associated data includes sorting said associated data.

30. The method of claim 29 wherein said processing said associated data includes categorizing said associated data.

31. The method of claim 26 further including accessing remote computers based upon references included in said associated data.

32. The method of claim 26 further including printing portions of said associated data.

33. A system comprising:

a primary data stream generator;

an associated data stream generator;

a data synchronizer;

a sequencer having as inputs said primary data stream generator, said associated data stream generator and said synchronizer, said sequencer being adapted to generate a combination signal containing said primary data stream and said associated data;

a delivery sub-system connected to the output of said sequencer for delivering said combination signal to said consumer;

consumer location equipment comprising:

a receiver for said combination signal;

a decoder connected to said receiver for separating said associated data from said combination signal;

a memory storing said associated data, said means being connected to said decoder;

a processor connected to said memory for accessing said stored associated data;

a human interface connected to said processor for displaying said associated data; and a two-way communications channel connected to said processor.

34. The system of claim 33 wherein said human interface comprises a computer monitor and keyboard.

35. The system of claim 33 wherein said associated data includes data acquired from an online service.

36. The system of claim 33 wherein said associated data includes data acquired from the Internet.

37. The system of claim 33 wherein said associated data includes pointers to data in an online service.

38. The system of claim 33 wherein said associated data includes instructions and data to be executed by said processing means.

39. The system of claim 33 wherein said associated data includes pointers to data on the Internet.

40. The system of claim 33 wherein said associated data includes pointers to Internet News Group articles.

41. The system of claim 33 wherein said associated data includes pointers to Internet Relay Chat forums.

42. The system of claim 33 wherein said associated data includes pointers to World Wide Web pages.

\* \* \* \* \*